United States Patent [19]

Miale

[11] 4,324,696

[45] Apr. 13, 1982

[54] METHOD OF PREPARING CRYSTALLINE ZEOLITE CATALYST OF HIGH ACTIVITY

[75] Inventor: Joseph N. Miale, Lawrenceville, N.J.

[73] Assignee: Mobil Oil Corporation, New York, N.Y.

[21] Appl. No.: 128,757

[22] Filed: Mar. 10, 1980

[51] Int. Cl.³ .............................................. B01J 29/28
[52] U.S. Cl. .................................................. 252/455 Z
[58] Field of Search ................................... 252/455 Z

[56] References Cited

U.S. PATENT DOCUMENTS

| | | | |
|---|---|---|---|
| 3,140,252 | 7/1964 | Frilette et al. | 252/455 Z |
| 3,293,192 | 12/1966 | Maher et al. | 252/455 Z |
| 3,331,882 | 7/1967 | Mattox | 252/455 Z |
| 3,391,075 | 7/1968 | Plank et al. | 252/455 Z |

*Primary Examiner*—Carl F. Dees
*Attorney, Agent, or Firm*—Charles A. Huggett; Michael G. Gilman; Charles J. Speciale

[57] ABSTRACT

Super active catalyst of high hydrocarbon conversion activity prepared by contacting crystalline zeolite materials of silica/alumina mole ratios greater than 7 and having a constraint index between $\frac{1}{2}$ and 12 with steam followed by base exchange of the resultant steamed product with an ammonium salt.

8 Claims, No Drawings

METHOD OF PREPARING CRYSTALLINE ZEOLITE CATALYST OF HIGH ACTIVITY

FIELD OF THE INVENTION

This invention relates to super active catalysts of high hydrocarbon conversion activity and a method for preparing them from high silica/alumina crystalline zeolite materials.

DESCRIPTION OF THE PRIOR ART

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as $Ca/2$, $Sr/2$, $Na$, $K$ or $Li$ is equal to unity. One type of cation may often be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are usually occupied by molecules of water prior to dehydration.

Prior art techniques have resulted in the formation of a great variety of synthetic aluminosilicates. These aluminosilicates have come to be designated by letter or other convenient symbols, as illustrated by zeolite A (U.S. Pat. No. 2,882,243), zerolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752) zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-35 (U.S. Pat. No. 4,016,245), zeolite ZSM-21 and 38 (U.S. Pat. No. 4,046,859), and zeolite ZSM-23 U.S. Pat. No. 4,076,842), merely to name a few.

U.S. Pat. No. 3,493,519 teaches a method of activation and stabilization of U-faujasite. There, a chelating agent was used after steaming to take out the excess aluminum from the zeolite. The high pH (7–9) disclosed was required to keep conditions favorable for aluminum removal.

SUMMARY OF THE INVENTION

In contrast to U.S. Pat. No. 3,493,519, and surprisingly, for reasons not yet known, the present invention does not require the use of a chelating agent.

In accord with the invention a process for producing super active catalysts of high hydrocarbon conversion activity has been discovered which comprises contacting crystalline zeolite materials of high silica/alumina mole ratios with steam followed by base exchange with ammonium or acid solutions. (Steaming range between about 5 to 150 PSI, 5 to 100% $H_2O$ 750° to 1200° F., 10 minutes to 1200 days, using the longer times for low temperature range and short times for high temperature range. Pref: atmosphere steaming 100% $H_2O$ pressure 1 to 2 hours @ 1000° F., 4 to 24 hours @ 900° F. 0.1 to 5 N solutions, preferably 0.5 to 1 N $NH_4^+$ solution. This combination of steaming plus base exchange raises the activity levels many times over that of the starting materials.

DESCRIPTION OF PREFERRED EMBODIMENTS

The present method provides unexpected superactivation of certain high silica/alumina zeolites, that is those having a silica/alumina mole ratio greater than 7 and a constraint index between ½ and 12. Particularly suitable are those zeolites known as ZSM-12, ZSM-20, and ZSM-23.

An important characteristic of the crystal structure of this class of zeolites is that it provides constrained access to, and egress from the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type zeolites useful in this invention possess, in combination: a silica to alumina mole ratio of at least about 7; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels.

The type zeolites useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is excluded and the zeolite is not of the desired type. Windows of 10-membered rings, or greater, are preferred.

Rather than attempt to judge from crystal structure whether or not a zeolite possesses the necessary constrained access, a simple determination of the "constraint index" may be made by passing continuously a mixture of an equal weight of normal hexane and 3-methylpentane over a small sample, approximately 1 gram or less, of catalyst at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature adjusted between 550° F. and 950° F. to give an overall conversion between 10% and 60%. The mixture of hydrocarbons is passed at 1 liquid hourly space velocity (i.e., 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromotography, to determine the fraction remaining unchanged for each of the two hydrocarbons.

The "constraint index" is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. Zeolites suitable for the present invention are those having a constraint index in the approximate range of 1 to 12. Constraint Index (CI) values for some typical zeolites are:

| Zeolite | C.I. |
| --- | --- |
| ZSM-5 | 8.3 |
| ZSM-11 | 8.7 |
| ZSM-12 | 2 |
| ZSM-20 | ½ |
| ZSM-23 | 9.1 |
| ZSM-35 | 4.5 |
| ZSM-38 | 2 |
| ZSM-48 | 3.4 |
| TMA Offretite | 3.7 |

It is to be realized that the above constraint index values typically characterize the specified zeolites but that such are the cumulative result of several variables used in determination and calculation thereof. Thus, for a given zeolite depending on the temperature employed within the aforenoted range of 550° F. to 950° F., with accompanying conversion between 10% and 60%, the constraint index may vary within the indicated approximate range of ½ to 12. Likewise, other variables such as the crystal size of the zeolite, the presence of possible occluded contaminants and binders intimately combined with the zeolite may affect the constraint index. It will accordingly be understood by those skilled in the art that the constraint index, as utilized herein, while affording a highly useful means for characterizing the zeolites of interest is approximate, taking into consideration the manner of its determination, with probability, in some instances, of compounding variable extremes. However, in all instances, at a temperature within the above-specified range of 550° F. to 950° F., the constraint index will have a value for any given zeolite of interest herein within the approximate range of ½ to 12.

ZSM-12 compositions can be identified, in terms of mole ratios of oxides and in the anhydrous state as follows:

(1.0±0.4)M$_{2/n}$O: Al$_2$O$_3$: 20 SiO$_2$ wherein M is at least one cation having a valence n, and can be a mixture of alkali metal cations, especially sodium, and tetralkylammonium cations, the alkyl groups containing 2-5 carbon atoms.

The x-ray diffraction pattern of the zeolite ZSM-12 has the following significant lines:

TABLE 1

| Interplanar Spacing d(A) | Relative Intensity I/Io |
| --- | --- |
| 11.9 ± 0.2 | M |
| 10.1 ± 0.2 | M |
| 4.76 ± 0.1 | W |
| 4.29 ± 0.08 | VS |
| 3.98 ± 0.08 | M |
| 3.87 ± 0.07 | VS |
| 3.49 ± 0.07 | W |
| 3.38 ± 0.07 | M |
| 3.20 ± 0.06 | W |
| 3.05 ± 0.05 | W |
| 2.54 ± 0.03 | W |

Zeolite ZSM-20, for example, has the formula, in terms of mole ratios of oxides and in the anhydrous states, as follows:

(0.3–0.6)R$_2$O: (0.4–0.7)M$_2$O: Al$_2$O$_3$: >7 SiO$_2$ wherein R is a tetraethylammonium cation, and M is an alkali metal, e.g. sodium.

ZSM-20 possesses a definite distinguishing crystalline structure whose X-ray diffraction pattern shows the following significant lines:

TABLE 2

| Interplanar Spacing d(A) | Relative Intensity |
| --- | --- |
| 14.90 ± 0.3 | VS |
| 14.21 ± 0.3 | VS |
| 8.67 ± 0.02 | M |
| 8.19 ± 0.15 | W |
| 7.44 ± 0.15 | M |
| 5.66 ± 0.10 | S |
| 5.34 ± 0.10 | W |
| 5.17 ± 0.10 | W |
| 5.00 ± 0.10 | W |
| 4.87 ± 0.10 | W |
| 4.74 ± 0.10 | W |
| 4.33 ± 0.09 | M |
| 3.98 ± 0.08 | W |
| 3.83 ± 0.08 | W |
| 3.76 ± 0.08 | M |
| 3.66 ± 0.07 | S |
| 3.60 ± 0.07 | W |
| 3.55 ± 0.07 | W |
| 3.45 ± 0.07 | W |
| 3.33 ± 0.07 | W |
| 3.29 ± 0.07 | M |
| 3.20 ± 0.06 | W |
| 2.90 ± 0.06 | W |
| 2.84 ± 0.06 | M |
| 2.79 ± 0.06 | W |
| 2.75 ± 0.06 | W |
| 2.70 ± 0.05 | W |
| 2.61 ± 0.05 | M |
| 2.41 ± 0.05 | W |
| 2.37 ± 0.05 | W |
| 2.17 ± 0.04 | W |
| 2.14 ± 0.04 | W |
| 2.09 ± 0.04 | W |
| 2.05 ± 0.04 | W |

ZSM-23 has the formula in terms of mole ratios of oxides and in the anhydrous state as follows:

(0.58–3.4) M$_{2/n}$O: Al$_2$O$_3$: >40 SiO$_2$ wherein M is at least one cation having a valence n. M can be sodium or a cation of a quaternary compound of an element of Group 5A, or mixtures thereof.

The X-ray diffraction pattern of the zeolite ZSM-23 of the present invention has the following significant lines:

TABLE 3

| Interplanar Spacing d(A) | Relative Intensity |
|---|---|
| 11.2 ± 0.23 | M |
| 10.1 ± 0.20 | W |
| 7.87 ± 0.15 | W |
| 5.59 ± 0.10 | W |
| 5.44 ± 0.10 | W |
| 4.90 ± 0.10 | W |
| 4.53 ± 0.10 | S |
| 3.90 ± 0.08 | VS |
| 3.72 ± 0.08 | VS |
| 3.62 ± 0.07 | VS |
| 3.54 ± 0.07 | M |
| 3.44 ± 0.07 | S |
| 3.36 ± 0.07 | W |
| 3.16 ± 0.07 | W |
| 3.05 ± 0.06 | W |
| 2.99 ± 0.06 | W |
| 2.85 ± 0.06 | W |
| 2.54 ± 0.05 | M |
| 2.47 ± 0.05 | W |
| 2.40 ± 0.05 | W |
| 2.34 ± 0.05 | W |

These values for ZSM-12, ZSM-20 and ZSM-23 were determined by standard techniques. The radiation was the K-alpha doublet of copper and a diffractometer equipped with a scintillation counter and a strip chart recorder was used. The peak heights, I, and the positions as a function of 2 theta, where theta is the Bragg angle, were read from the diffractometer chart. From these, the relative intensities, 100 $I/I_o$, where $I_o$ is the intensity of the strongest line or peak, and d(obs), the interplanar spacing in A, corresponding to the recorded lines, were calculated. In the tables the relative intensities are given in terms of the symbols VS=Very Strong, S=Strong, M=Medium, W=Weak, and VW=Very Weak. It should be understood that each X-ray diffraction pattern is characteristic of all the species of each zeolite structure, i.e. ZSM-5, ZSM-11 and ZSM-12, respectively.

The sodium form as well as other cationic forms reveal substantially the same pattern with some minor shifts in interplanar spacing and variation in relative intensity. Other minor variations can occur depending on the silicon to aluminum ratio of the particular sample, as well as if it has been subjected to thermal treatment.

The above zeolites can be used either in the alkali metal form, e.g. the sodium form, the ammonium form, the hydrogen form or another univalent or multivalent form. When used as catalysts they will be subjected to thermal treatment to remove part or all of any organic constituent.

The zeolite crystals prepared by the instant invention are shaped in a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the catalyst crystals can be extruded before drying or dried or partially dried and then extruded.

The zeolites prepared can also be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition, impregnated therein or physically intimately admixed therewith. Such component can be impregnated in or on to it, such as, for example, by, in the case of platinum, treating the zeolite with a solution containing a platinum metal-containing ion. Thus, suitable platinum compounds include chloroplatinic acid, platinous chloride and various compounds containing the tetrammine-platinum complex.

In the case of many catalysts it is desired to incorporate the zeolite with another material resistant to the temperatures and other conditions employed in organic conversion processes. Such materials include active and inactive materials and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the zeolite material, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally-occurring clays, e.g. bentonite and kaolin, to improve the crush strength of the catalyst under commercial operating conditions. Said material, i.e. clays, oxides, etc., function as binders for the catalyst. It is required to provide a catalyst having good crush strength because in commercial use it is desirable to prevent the catalyst from breaking down into powder-like materials. These clay binders also improve the crush strength of the catalyst.

Naturally-occurring clays which can be composited with the zeolite crystals include the montmorillonite and kaoline family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the catalyst also include inorganic oxides, notably alumina.

In addition to the foregoing materials, the zeolite catalysts can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided catalyst and inorganic oxide gel matrix vary widely with the zeolite content ranging from about 1 to about 90 percent by weight and more usually, particularly when the composite is prepared in the form of beads, in the range of about 2 to about 60 percent by weight of the composite. Catalytically active forms of the zeolite catalysts prepared by the improved method of this invention are useful for cracking of hydrocarbons.

Employing a catalytically active form of the zeolite catalysts prepared by the improved method of this invention which may contain additional hydrogenation components, reforming stocks can be reformed. The catalyst can also be used for hydroisomerization of normal paraffins, when provided with a hydrogenation component, e.g., platinum.

Other reactions which can be accomplished employing the catalyst of this invention containing a metal, e.g., platinum, include hydrogenation-dehydrogenation reactions and desulfurization reactions, olefin polymerization (oligomerization) and other organic compound conversion such as the conversion of alcohols (e.g. methanol) to hydrocarbon.

In order to more fully illustrate the nature of the invention and the manner of practicing same, the following examples are presented, wherein ZSM-12, ZSM-20 and ZSM-23 crystals were treated in accord with the invention.

Catalyst activity is measured by hexane cracking as described by P. B. Weisz and J. N. Miale in J. Cat. 4, 527–529 (1965), and in U.S. Pat. No. 3,354,078.

EXAMPLE 1

A sample of ammonium ZSM-20 was calcined in flowing air at 1000° F., then tested for hexane cracking activity at 600° F.

EXAMPLE 2

A sample of the same ammonium ZSM-20 was steamed for 90 minutes at 1000° F. and tested for hexane cracking activity.

EXAMPLE 3

The product of Example 2 was base exchanged for 4 hours with 1 N $(NH_4)_2SO_4$ at 80° C. (2 contacts). After washing until sulfate free with water and drying at 130° C., the catalyst was tested for hexane cracking activity as the Example 1.

EXAMPLE 4

A sample of HZSM-12 was calcined as in Example 1 and tested for hexane cracking activity.

EXAMPLE 5

A sample of HZSM-12, used for Example 5, was steamed and tested as in Example 2.

EXAMPLE 6

The product of Example 5 was exchanged and tested as in Example 3.

EXAMPLE 7

A sample of HZSM-23 was calcined as in Example 1 and tested for hexane cracking activity.

EXAMPLE 8

A sample of the HZSM-23, used for Example 7, was steamed and tested as in Example 2.

EXAMPLE 9

The product of Example 8 was exchanged and tested as in Example 3.

| Example | HEXANE CRACKING ACTIVITIES | Activity, | Activity Rel. to Fresh |
|---|---|---|---|
| 1 | HZSM-20 | 710 | |
| 2 | Example 1 + steam | 16 | |
| 3 | Example 2 + exchange | 17,500 | 25 |
| 4 | HZSM-12 | 102 | |
| 5 | Example 5 + steam | 87 | |
| 6 | Example 6 + exchange | 146 | 1.4 |
| 7 | HZSM-23 | 34 | |
| 8 | Example 7 + steam | 66 | |
| 9 | Example 8 + exchange | 94 | 2.8 |

Note Examples 3, 6 and 9 wherein activities observed ranged from 1½ to 25 times those of the starting materials. In Example 8, some superactivation is accomplished by steam alone.

EXAMPLE 10

A sample of HZSM-5 ($\alpha=230$) was steamed at 1000° F. in a stream containing helium saturated with a hexane at 25° C. and then with water at 58° C. Steaming was carried out until a maximum hexane cracking activity at 316 $\alpha$ was attained and a subsequent reduction to 302 $\alpha$ (at 3 hrs). The sample was then exchanged with 1 N $NH_4 NO_3$ at 80° C. washed and dried at 130° C. It was next calcined at 538° C. (1000° F.) where it was found to have a cracking activity of 550.

What is claimed is:

1. A method for preparing a super active synthetic crystalline zeolite catalyst material of high hydrocarbon conversion activity having a constraint index between about ½ and 12 and a $SiO_2/Al_2O_3$ mole ratio greater than 7 which comprises contacting the hydrogen form of zeolite ZSM-12, ZSM-20 or ZSM-23 with steam followed by base exchange of the resultant steamed product with an ammonium salt.

2. The product produced by the method of claim 1.

3. A method according to claim 1 wherein steaming is conducted at between about 50 to 100% $H_2O$ pressure for a period between about 10 minutes and 2 hours at about 1000° F. or for a period between about 4 and 24 hours at about 900° F.

4. A method according to claim 3 wherein said ammonium salt solution is between about 0.1 and 5 N.

5. The product produced by the method of claims 3 or 4.

6. A method according to claim 1 wherein said zeolite is the acid form of zeolite ZSM-12.

7. A method according to claim 1 wherein said zeolite is the acid form of zeolite ZSM-20.

8. A method according to claim 1 wherein said zeolite is the acid form of zeolite ZSM-23.

* * * * *

UNITED STATES PATENT AND TRADEMARK OFFICE
CERTIFICATE OF CORRECTION

PATENT NO. : 4,324,696

DATED : April 13, 1982

INVENTOR(S) : Joseph N. MIALE

It is certified that error appears in the above—identified patent and that said Letters Patent is hereby corrected as shown below:

Column 1, line 64, change "U" to ---Y---

Column 4, line 53, after "2.90± 0.06     W"  insert ---2.87 ± 0.06      W---

Signed and Sealed this

Twenty-third Day of November 1982

[SEAL]

Attest:

GERALD J. MOSSINGHOFF

Attesting Officer       Commissioner of Patents and Trademarks